(12) United States Patent
Anzai

(10) Patent No.: US 9,741,086 B2
(45) Date of Patent: Aug. 22, 2017

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Shizuka Anzai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 14/600,873

(22) Filed: Jan. 20, 2015

(65) Prior Publication Data

US 2015/0206274 A1  Jul. 23, 2015

(30) Foreign Application Priority Data

Jan. 22, 2014  (JP) .................................. 2014-009880

(51) Int. Cl.
*G06T 1/20*  (2006.01)
*G06T 5/20*  (2006.01)

(52) U.S. Cl.
CPC .................. *G06T 1/20* (2013.01); *G06T 5/20* (2013.01); *G06T 2207/20021* (2013.01)

(58) Field of Classification Search
USPC ........................................ 382/205, 260–265
See application file for complete search history.

(56) References Cited

U.S. PATENT DOCUMENTS

| | | | | |
|---|---|---|---|---|
| 7,016,549 B1* | 3/2006 | Utagawa | ............... | G06T 3/4015 382/260 |
| 7,412,109 B2* | 8/2008 | Kong | .................... | G06T 7/0081 375/E7.135 |
| 7,920,754 B2* | 4/2011 | Takahashi | ............... | G06T 5/003 348/606 |
| 8,184,181 B2* | 5/2012 | Tsuruoka | .............. | G06T 3/4015 348/241 |
| 8,582,890 B2* | 11/2013 | Liba | ........................ | G06T 7/403 382/199 |
| 8,730,355 B2* | 5/2014 | Eki | ....................... | H04N 5/3456 348/241 |
| 9,014,483 B2* | 4/2015 | Ito | ....................... | G06K 9/00973 382/118 |
| 9,432,670 B2* | 8/2016 | Fu | .......................... | H04N 19/82 |
| 2012/0082241 A1* | 4/2012 | Tsai | ..................... | H04N 19/176 375/240.25 |

FOREIGN PATENT DOCUMENTS

| JP | 2000312311 A | 11/2000 |
|---|---|---|
| JP | 2009010613 A | 1/2009 |

\* cited by examiner

*Primary Examiner* — Ishrat I Sherali
(74) *Attorney, Agent, or Firm* — Canon USA, Inc. I.P. Division

(57) ABSTRACT

The present invention provides an image processing method that allows filter processing to be easily and appropriately performed on divided images. An image processing unit 105 performs the filter processing on pixels in a divided image 1, and pixels that do not require reference to pixels in a divided image 3 that are not stored in a pixel storage unit 103, among margin pixels 3T stored in the pixel storage unit 103. Further, an image processing unit 106, which performs the filter processing in parallel with the image processing unit 105, performs the filter processing on pixels that do not require reference to the pixels in the divided image 1, among pixels in the divided image 3.

16 Claims, 11 Drawing Sheets

FIG. 8

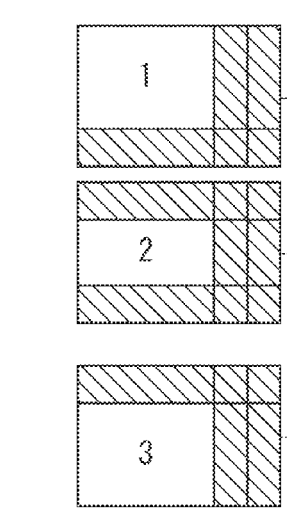

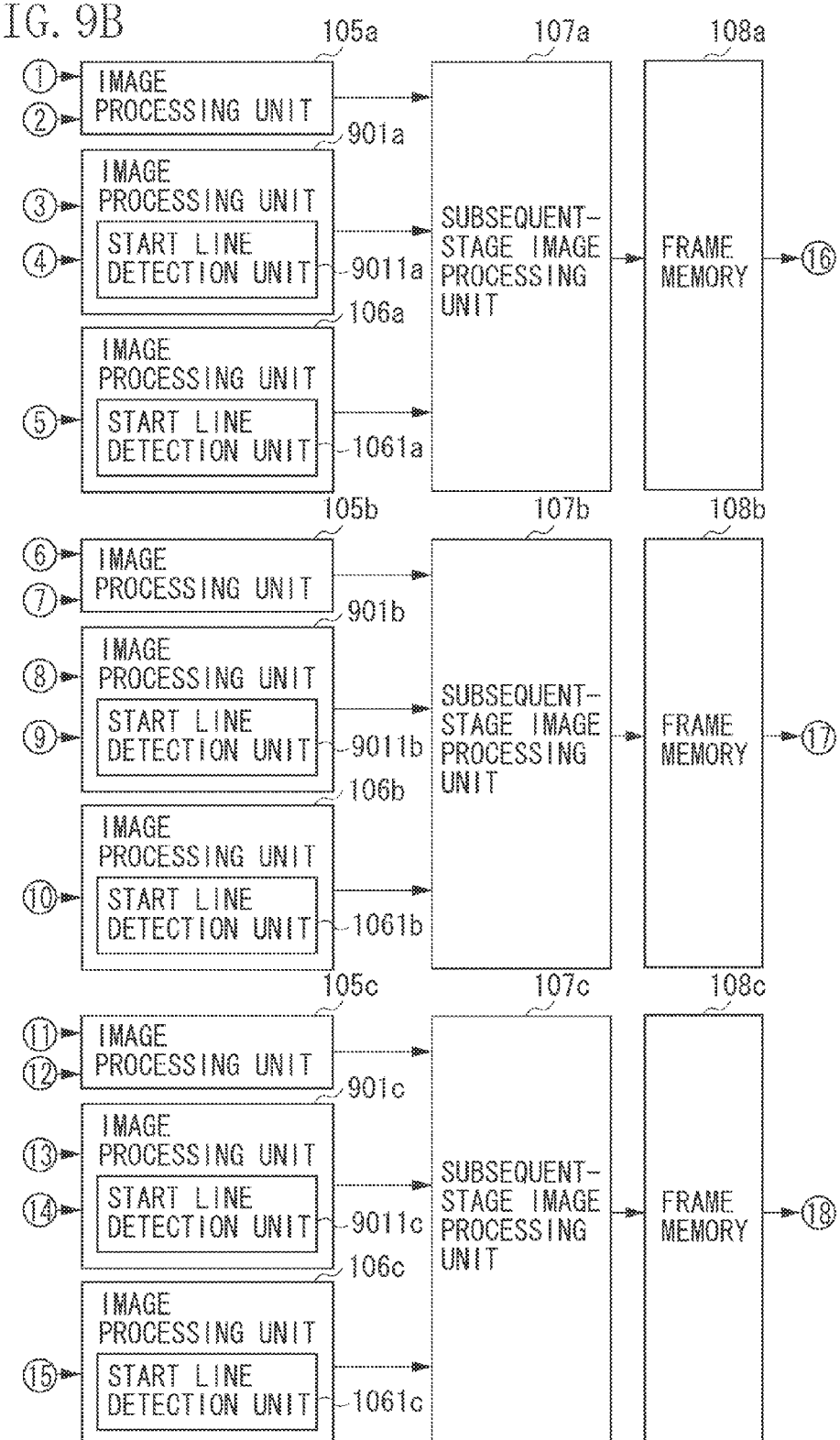

IMAGE PROCESSING APPARATUS, IMAGE PROCESSING METHOD, AND STORAGE MEDIUM STORING PROGRAM

BACKGROUND OF THE INVENTION

Field of the Invention

The present invention relates to an image processing apparatus and an image processing method, and in particular, to an image processing apparatus and an image processing method that can be effectively used for dividing an image of a single frame into a plurality of images and processing the plurality of divided images.

Description of the Related Art

Conventionally, regarding image processing performed on a high-resolution image such as a 4000×2000 (4K2K) image and an 8000×4000 (8K4K) image, there have been proposed an architecture for dividing an image of a single frame into a plurality of full high definition (FHD) images and processing the plurality of divided FHD images in parallel, and a method for transmitting images divided in advance. A pixel adjacent to a pixel at an end of a divided image corresponds to a pixel at an end of a divided image adjacent to this divided image. Therefore, when filter processing is performed on the end of the divided image, this processing is performed with reference to a part of pixels at the end of the divided image adjacent to this divided image. In the following description, a term "margin pixel" will be used to call, among pixels at an end of a divided image, a pixel that is referred to when the filter processing is performed on an end of a divided image adjacent to this divided image, as necessary.

There are techniques discussed in Japanese Patent Application Laid-Open Nos. 2000-312311 and 2009-010613 as techniques for performing the filter processing on the divided image in this manner.

According to the technique discussed in Japanese Patent Application Laid-Open No. 2000-312311, after dividing an image of a single frame acquired from a television camera into a plurality of images, an image processing apparatus generates an image in which a margin pixel is added to each of all of the divided images as a pixel at an end of a divided image adjacent to this divided image that is referred to during the filter processing. Then, by referring to the margin pixel added to the divided image, the image processing apparatus processes a pixel at an end of this divided image.

According to the technique discussed in Japanese Patent Application Laid-Open No. 2009-010613, an image processing apparatus receives an image of a single frame, divides the received image into a plurality of images to read out the divided images, performs signal processing on the divided images, and then outputs the divided images. When reading out the divided images, the image processing apparatus scans two divided images vertically adjacent to each other by scanning lines in the upper divided image from the top to the bottom while scanning lines in the lower divided image from the bottom to the top.

However, in a case where the image processing apparatus is configured to include a filter processing circuit immediately after an input for an image analysis or the like, and the divided images are input in parallel, the technique discussed in Japanese Patent Application Laid-Open No. 2000-312311 requires another divided image to be stored in a frame buffer during processing of one divided image. Alternatively, this technique requires a line buffer for the margin pixel to be prepared for each of the divided images to process the divided images in parallel. Therefore, the technique involves a problem of an increase in a memory cost.

Further, according to the technique discussed in Japanese Patent Application Laid-Open No. 2009-010613, scanning directions (readout directions) in the divided images that are referred to by each other are set to reverse directions of each other so that upper and lower margin pixels are referred to by the image processing apparatus at similar timings. In a commonly-used image scanning method, pixels are scanned from the left to the right with respect to a horizontal direction, and pixels are scanned from the top to the bottom with respect to a vertical direction. Therefore, this technique involves a problem of requiring a special transmission/reception apparatus when the image is transmitted.

SUMMARY OF THE INVENTION

According to an aspect of the present invention, an image processing apparatus includes an input unit configured to input at least two divided images adjacent to each including a first divided image and a second divided image other among divided images generated by dividing a single image into a plurality of images, and a first image processing unit configured to perform image processing for determining pixel data of a processing target pixel with use of surrounding pixel data on the input first divided image and a part of the input second divided image. The first image processing unit performs the image processing on the first divided image with use of pixel data of a partial image in the second divided image as the surrounding pixel data. The image processing apparatus further includes a second image processing unit configured to perform image processing for determining the pixel data of the processing target pixel with use of the surrounding pixel data on the input second divided image. The second image processing unit performs the image processing on a region in the second divided image for which the image processing can be performed without use of pixel data of the first divided image as the surrounding pixel data. The image processing by the first image processing unit and the image processing by the second image processing unit are performed in parallel. The image processing apparatus further includes an output unit configured to output the first divided image processed by the first image processing unit and the second divided image processed by the second image processing unit.

Further features of the present invention will become apparent from the following description of exemplary embodiments with reference to the attached drawings.

BRIEF DESCRIPTION OF THE DRAWINGS

FIG. 8 illustrates a modification of the entire image of the single frame before the image is divided.

DESCRIPTION OF THE EMBODIMENTS

In the following description, an exemplary embodiment of the present invention will be described with reference to the drawings.

A first exemplary embodiment will be described based on the following example. Two upper and lower divided images, among four divided images acquired by dividing an 8K4K image into two images in each of vertical and horizontal directions, are input into a single image processing apparatus. Then, this image processing apparatus performs image processing while processing the two upper and lower divided images at one time, and an image having the same size as the original 8K4K image is output in the end.

Figure 1:
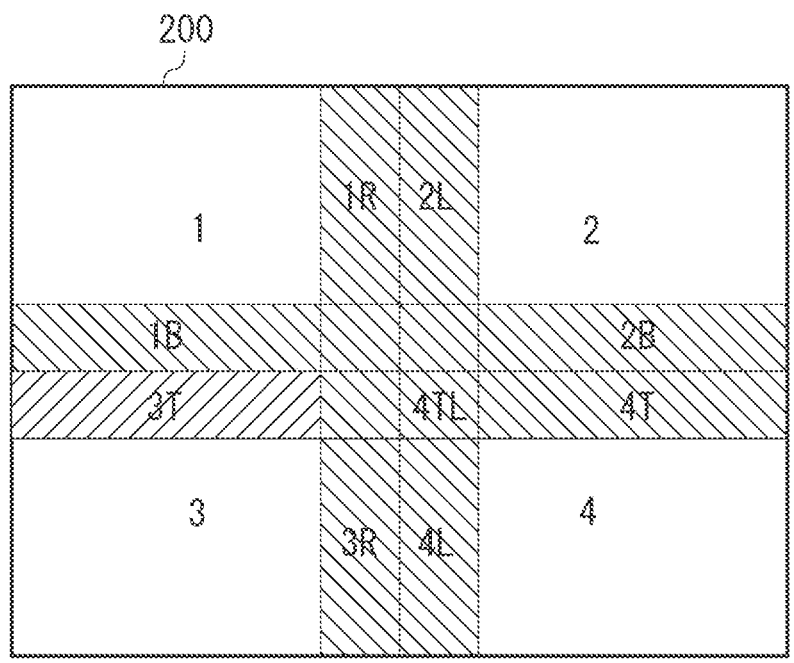
FIG. 1 illustrates an entire image of a single frame before the image is divided.

FIG. 1 illustrates an example of an input format of an image. More specifically, FIG. 1 illustrates an example of an entire image of a single frame before the image is divided.

After being input into an image processing system, the image is divided into two images in each of the vertical and horizontal directions, i.e., is divided into four images in total. Then, one of two pairs, each of which includes two upper and lower divided images, is input into one of two image processing apparatuses, and the other of the two pairs is input into the other of the two image processing apparatuses.

A region 200 indicates divided images 1, 2, 3, and 4. Shaded regions in the region 200 indicate margin pixels. In the filter processing, a value of a pixel that is a target of this processing is changed with use of values of pixels surrounding the pixel that is the target of the processing. Therefore, when the filter processing is performed on a pixel at an end of a divided image, this processing is performed with reference to a pixel in a divided image adjacent to this divided image as a margin pixel. For example, focusing on the divided image 4, a pixel that is referred to when the filter processing is performed on the divided image 2 is included in margin pixels 4T, and a pixel that is referred to when the filter processing is performed on the divided image 3 is included in margin pixels 4L. Further, a pixel that is referred to when the filter processing is performed on the divided image 1 is included in a pixel or pixels 4TL in a region where the margins 4L and 4T overlap each other. There is no margin pixel for a region at an end to which no adjacent divided image exists, such as a right-side portion and a bottom portion of the divided image 4.

Further, assume that, in all of the divided images 1 to 4, pixels are scanned in the same scanning direction (readout direction) when the filter processing is performed. More specifically, in the present exemplary embodiment, assume that the pixels are scanned from the left to the right with respect to the horizontal direction, and the pixels are scanned from the top to the bottom with respect to the vertical direction. Therefore, one of the two divided images 1 and 3 vertically adjacent to each other that is located at a position in an arrangement order that is scanned later according to the scanning direction is the divided image 3, and the other of the divided images 1 and 3 that is located at a position in the arrangement order that is scanned earlier according to the scanning direction is the divided image 1. The same also applies to the divided images 2 and 4.

Figure 2:
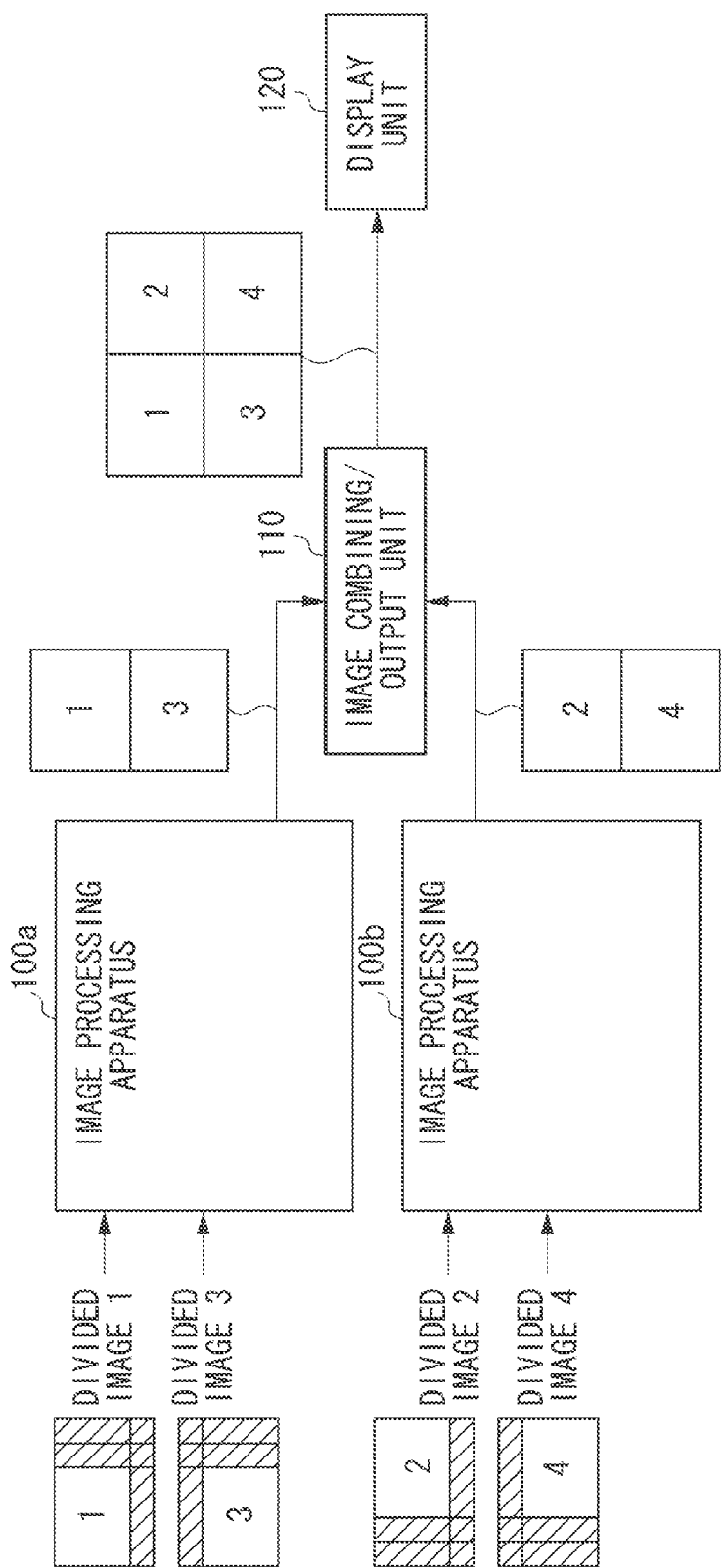
FIG. 2 is a block diagram illustrating an image processing system.

FIG. 2 illustrates an example of the image processing system.

In FIG. 2, the image processing system includes image processing apparatuses 100a and 100b (image processing chips). The image processing apparatus 100a simultaneously inputs the two divided images 1 and 3 vertically adjacent to each other in the vertical direction among the four divided images 1 to 4 with the margin pixels added thereto as will be described below, performs image processing on the two divided images 1 and 3, and outputs the two divided images 1 and 3 processed by the image processing after combining them. The image processing apparatus 100b simultaneously inputs the two divided images 2 and 4 vertically adjacent to each other among the four divided images 1 to 4 with the margin pixels added thereto as will be described below, performs the image processing on the two divided images 2 and 4, and outputs the two divided images 2 and 4 processed by the image processing after combining them.

The size of the image output from each of the image processing apparatuses 100a and 100b is the same as the size of an image generated by dividing the 8K4K image into two images on the left and the right.

An image combining/output unit 110 combines the images output from the image processing apparatuses 100a and 100b, and then outputs the combined image. The size of the image output from the image combining/output unit 110 is the same as the size of the 8K4K image. The image combining/output unit 110 identifies a positional relationship between the images output from the image processing apparatuses 100a and 100b by, for example, storing information indicating the positional information between the images output from the image processing apparatuses 100a and 100b in advance.

A display unit 120 displays the image output from the image combining/output unit 110. The display unit 120 can be realized by, for example, using a liquid crystal display.

Figure 3:
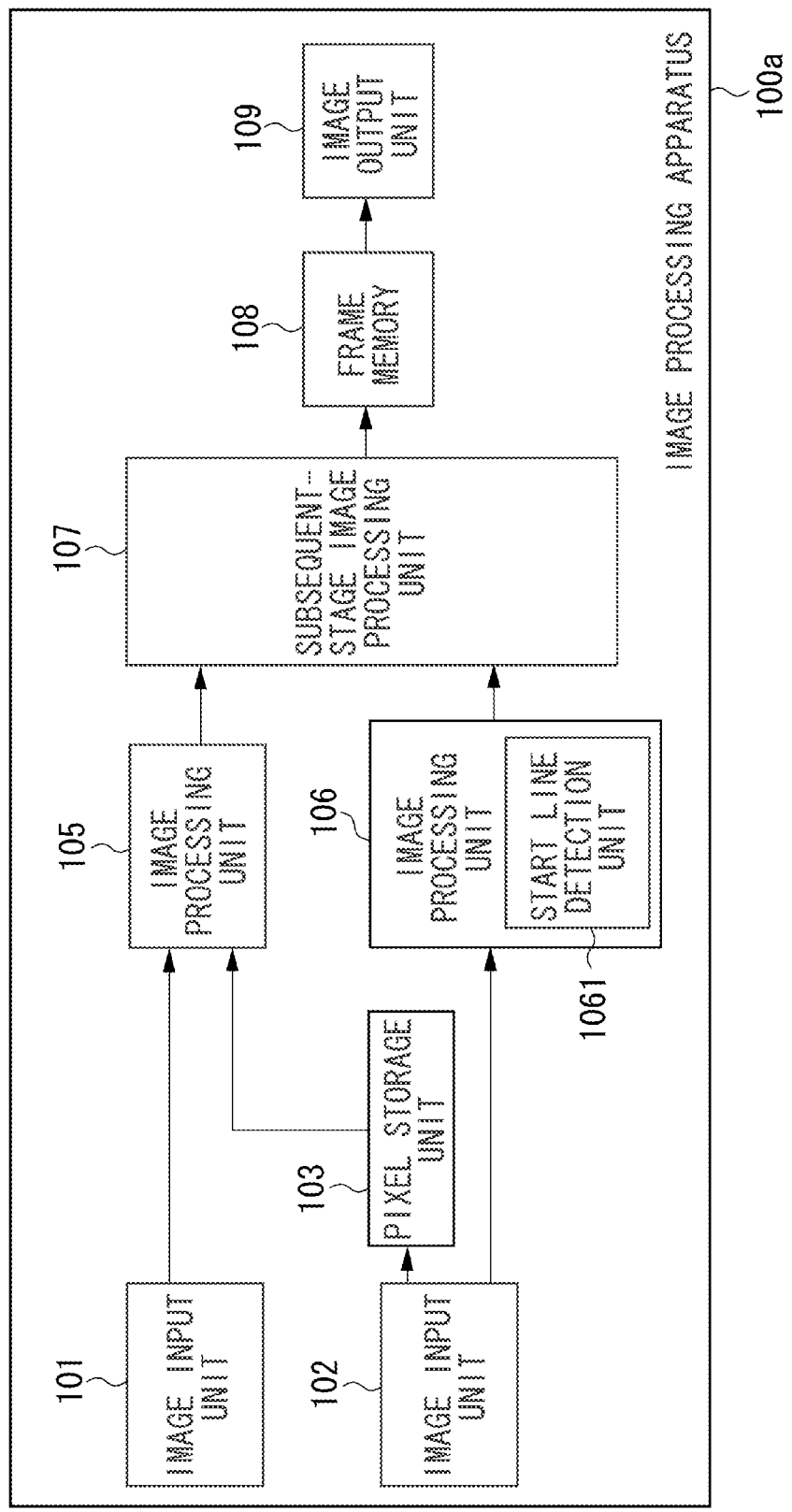
FIG. 3 is a block diagram illustrating a configuration of an image processing apparatus.

FIG. 3 illustrates an example of a configuration of the image processing apparatus 100a. The image processing apparatus 100b is configured similarly to the image processing apparatus 100a, and thus, a detailed description of a configuration of the image processing apparatus 100b will be omitted below.

Image input units 101 and 102 store the input divided images 1 and 3 into line buffers, respectively. Then, upon inputs of the numbers of lines (the numbers of rows) corresponding to the numbers of filter taps of image processing units 105 and 106 at a subsequent stage, the image input units 101 and 102 output pixels corresponding to these numbers of lines to the image processing units 105 and 106, respectively. The divided images 1 and 3 are input into the image input units 101 and 102 at the same time.

A pixel storage unit 103 stores values of pixels belonging to a first pixel group, which includes pixels (margin pixels 3T) that are referred to when the filter processing is performed on the pixels in the divided image 1, among the pixels in the divided image 3. Further, the pixel storage unit 103 stores values of pixels belonging to a second pixel group, which includes pixels that are other pixels than the pixels belonging to this first pixel group and are referred to when the filter processing is performed on the pixels belonging to this first pixel group, among the pixels in the divided image 3.

Supposing that a filter is a 3×3 filter, among the pixels in the divided image 3, pixels in a line (row) adjacent to the divided image 1 correspond to the pixels belonging to the first pixel group, and pixels in a line (row) below this line correspond to the pixels belonging to the second pixel group.

Further, the pixel storage unit 103 stores a value or values of a pixel or pixels belonging to a third pixel group, which includes a pixel or pixels (the margin pixel(s) 4TL illustrated in FIG. 1) that is/are referred to when the filter processing is performed on the pixels in the divided image 1, among the pixels added to the divided image 3 (the margin pixels 4L illustrated in FIG. 1). Further, the pixel storage unit 103 stores a value or values of a pixel or pixels belonging to a fourth pixel group, which includes a pixel or pixels that is/are another pixel or other pixels than the pixel(s) belonging to this third pixel group and is/are referred to when the filter processing is performed on the pixels belonging to the above-described first pixel group, among the pixels added to the divided image 3 (the margin pixels 4L illustrated in FIG. 1).

Supposing that the filter is the 3×3 filter, among the pixels in the divided image 4, a pixel adjacent to the divided image 1 (a pixel at an upper left corner) corresponds to the pixel belonging to the third pixel group, and a pixel below this pixel corresponds to the pixel belonging to the fourth pixel group.

The image processing units 105 and 106 perform the filter processing that is supposed to be performed on the divided images 1 and 3 immediately after the input, such as statistic processing, respectively.

A subsequent-stage image processing unit 107 performs image processing such as an interlace-progressive (IP) conversion and scaling on the divided images 1 and 3 subjected to the filter processing by the image processing units 105 and 106.

A frame memory 108 stores an output image generated by execution of the image processing by the subsequent-stage image processing unit 107.

An image output unit 109 reads out the output image from the frame memory 108, and outputs the output image according to an output timing.

Figure 4:
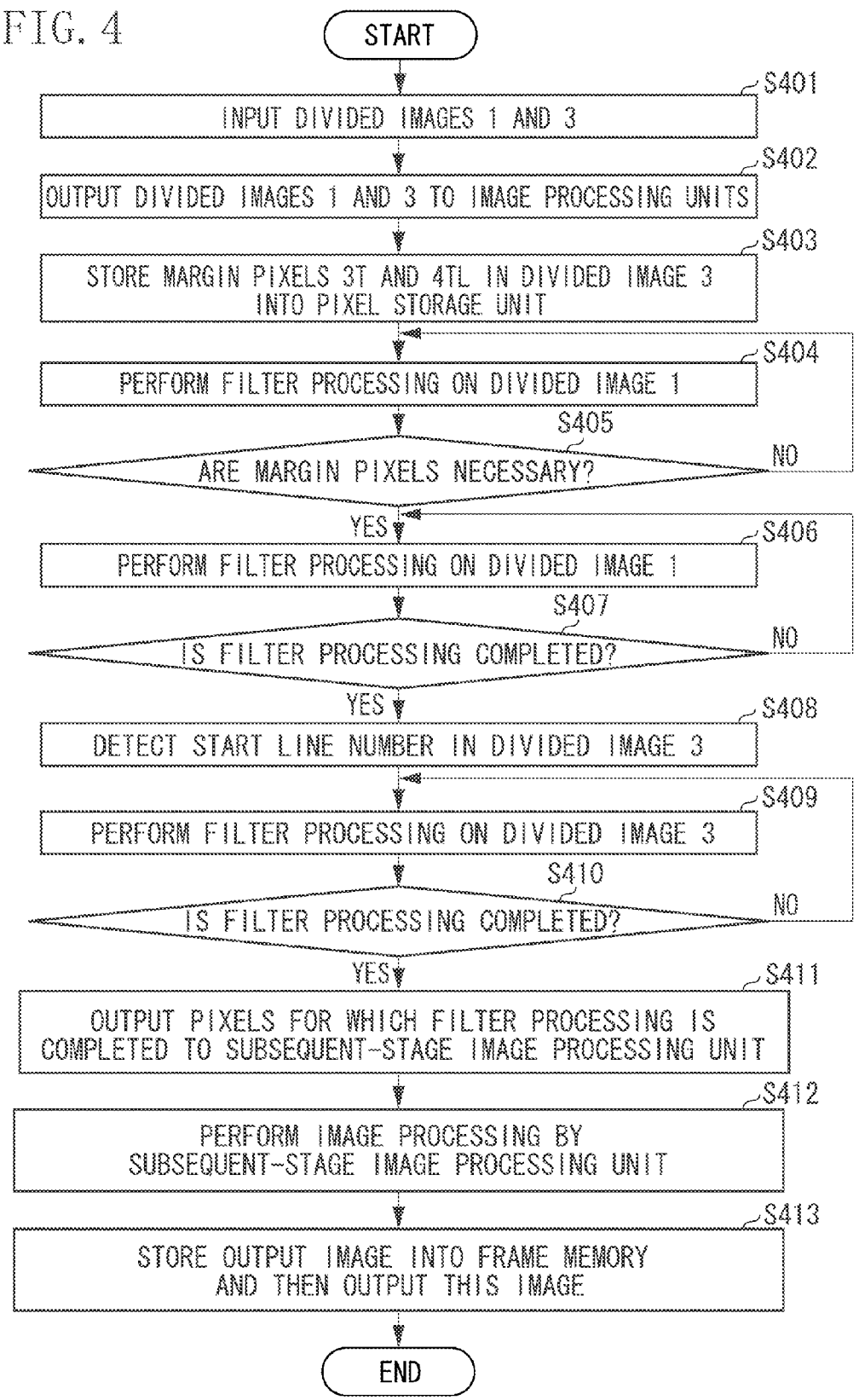
FIG. 4 is a flowchart illustrating an operation of the image processing apparatus.

FIG. 4 is a flowchart illustrating an example of an operation of the image processing apparatus 100a. Assume that steps S404 to S407 and steps S408 to S410 are performed in parallel with each other (parallel processing). Further, the image processing apparatus 100b operates in a similar manner to the image processing apparatus 100a, and thus, a detailed description of an operation of the image processing apparatus 100b will be omitted below.

Figure 5A:
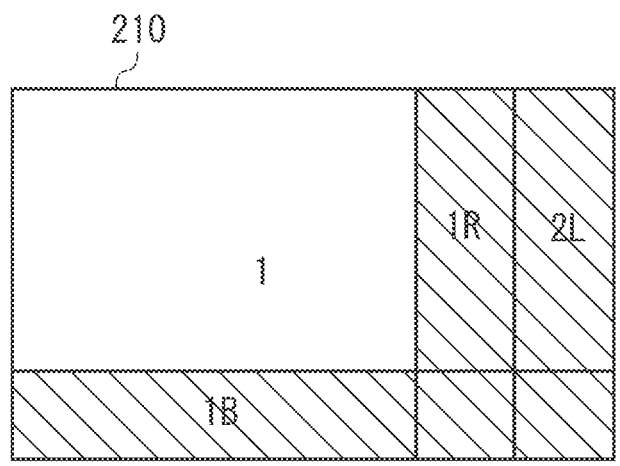
FIGS. 5A and 5B illustrate divided images input into image input units.
Figure 5B:
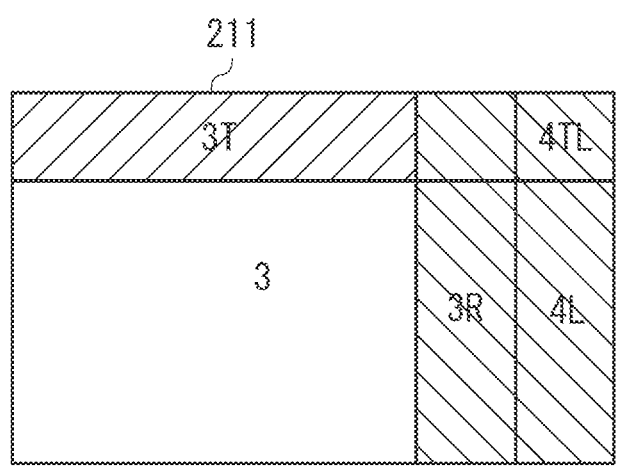

In step S401, the image input units 101 and 102 input the divided images 1 and 3, respectively. FIGS. 5A and 5B illustrate examples of the divided images 1 and 3 input into the image input units 101 and 102, respectively.

As illustrated in FIG. 5A, pixels that are referred to when the filter processing is performed on the divided image 1, among the pixels in the horizontally adjacent divided image 2, are added to the divided image 1 as margin pixels 2L. Similarly, pixels that are referred to when the filter processing is performed on the divided image 3, among the pixels in the horizontally adjacent divided image 4, are added to the divided image 3 as the margin pixels 4L.

Supposing that the filter is the 3×3 filter, pixels in a single line (column) adjacent to the divided image 1, among the pixels in the divided image 2, correspond to the margin pixels 2L. Further, pixels in a single line (column) adjacent to the divided image 3, among the pixels in the divided image 4, correspond to the margin pixels 4L.

The margin pixels 2L and 4L need not necessarily be added to the divided images 1 and 3 when the divided images 1 and 3 are input. For example, necessary margin pixels may be received from the other image processing apparatus 100b at the time of the filter processing by the image processing units 105 and 106, which will be described below. The same also applies to the divided images 2 and 4.

Subsequently, in step S402, the image input units 101 and 102 respectively output the divided images 1 and 3 with the margin pixels 2L and 4L added thereto to the image processing units 105 and 106 line by line (row by row) sequentially, starting from a top line (row).

Subsequently, in step S403, the image input unit 102 selects the values of the pixels including the margin pixels 3T and 4TL (the pixels belonging to the above-described first to fourth pixel groups) among the pixels in the divided image 3 with the margin pixels 4L added thereto, and stores the selected values into the pixel storage unit 103.

Subsequently, in step S404, the image processing unit 105 performs the filter processing on the divided image 1, each time the number of lines input from the image input unit 101 reaches a number that allows the image processing unit 105 to perform the filter processing.

Subsequently, in step S405, the image processing unit 105 determines whether the values of the pixels including the margin pixels 3T and 4TL (the pixels belonging to the above-described first to fourth pixel groups), which are stored in the pixel storage unit 103, are necessary to perform the filter processing on the divided image 1.

If a result of this determination indicates that the values of the pixels including the margin pixels 3T and 4TL are not necessary (NO in step S405), the processing of the flowchart illustrated in FIG. 4 returns to step S404, in which the image processing unit 105 continues performing the filter processing until the values of the pixels including the margin pixels 3T and 4TL become necessary (YES in step S405).

Then, when the values of the pixels including the margin pixels 3T and 4TL become necessary (YES in step S405), the processing of the flowchart illustrated in FIG. 4 proceeds to step S406. In step S406, the image processing unit 105 reads out the values of the pixels necessary to perform the filter processing on the divided image 1, among the values of the pixels including the margin pixels 3T and 4TL (the pixels belonging to the above-described first to fourth pixel groups), which are stored in the pixel storage unit 103. Then, the image processing unit 105 performs the filter processing on the divided image 1 with use of the read-out values of the pixels, each time the number of lines (the number of rows) input from the image input unit 101 reaches the number that allows the image processing unit 105 to perform the filter processing.

Further, the image processing unit 105 performs the filter processing also on the margin pixels 3T (the pixels for which the pixels in the divided image 1 should be referred to during the filter processing, among the pixels in the divided image 3), which are stored in the pixel storage unit 103.

Subsequently, in step S407, the image processing unit 105 determines whether the filter processing for the divided image 1 and the margin pixels 3T is completed. If a result of this determination indicates that the filter processing for the divided image 1 and the margin pixels 3T is not completed yet (NO in step S407), the processing of the flowchart illustrated in FIG. 4 returns to step S406, in which the image processing unit 105 continues performing the filter processing until the image processing unit 105 completes the filter processing for the divided image 1 and the margin pixels 3T (YES in step S407).

In step S408, a start line detection unit 1061 in the image processing unit 106 detects a number of an uppermost line (row) among lines (rows) in the divided image 3 for which the filter processing can be performed on the divided image 3 without reference to the pixels in the divided image 1. In the following description, this number will be referred to as a start line number as necessary.

Figure 6A:
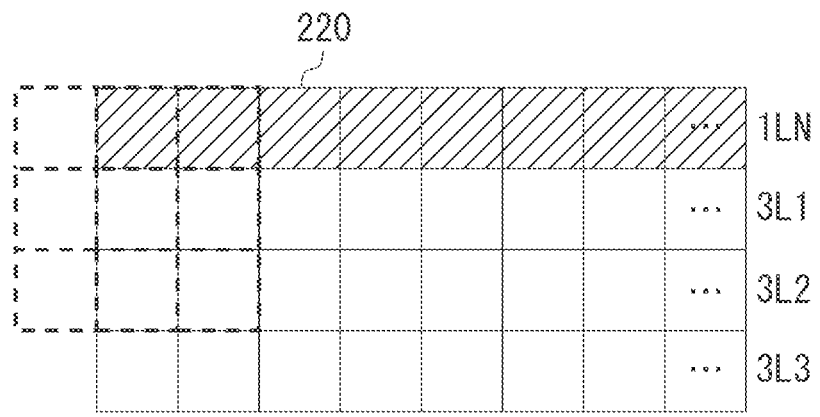
FIGS. 6A and 6B are diagrams each illustrating a start line number.
Figure 6B:
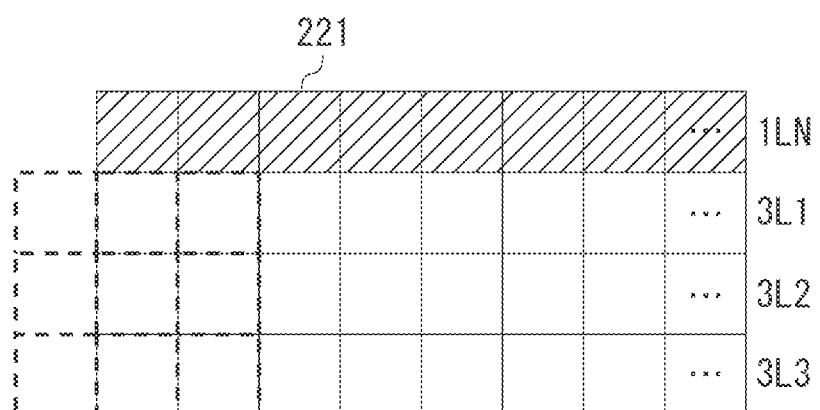

The start line number is calculated from, for example, the number of filter taps of the image processing unit 106. FIGS. 6A and 6B illustrate an example of the start line number. More specifically, FIG. 6A illustrates an example when the filter processing should be performed on the divided image 3 with reference to the values of the pixels in the divided image 1. Further, FIG. 6B illustrates an example when the filter processing should be performed on the divided image 3 without reference to the values of the pixels in the divided image 1.

FIGS. 6A and 6B illustrate three lines (rows) 3L1, 3L2, and 3L3 from the top in the divided image 3, and a last line (a lowermost line (row)) 1LN in the divided image 1 adjacent to the divided image 3.

The examples illustrated in FIGS. 6A and 6B are based on the assumption that a filter in the image processing unit 106 is the 3×3 filter. According to this assumption, when the filter processing is performed on pixels in the first line 3L1 in the divided image 3, pixels in the last line 1LN in the divided image 1 should be referred to, as indicated by an image 220 illustrated in FIG. 6A. Therefore, the number of this line 3L1 is not detected as the start line number.

On the other hand, when the filter processing is performed on pixels in the second line 3L2 from the top in the divided image 3, only the pixels in the divided image 3 should be referred to without requiring reference to the pixels in the last line 1LN in the divided image 1, as indicated by an image 221 illustrated in FIG. 6B. Therefore, the number of this line 3L2 is detected as the start line number.

Upon detection of the start line number in this manner, the processing of the flowchart illustrated in FIG. 4 proceeds to step S409, in which the image processing unit 106 performs the filter processing on the divided image 3, each time the number of lines input from the image input unit 102 reaches a number that allows the image processing unit 106 to perform the filter processing. As described above, the pixels in the divided image 1 need not be referred to when the filter processing is performed on the pixels corresponding to the start line number. Therefore, the image processing unit 106 can perform the filter processing in step S409 by using only the divided image 3 and the margin pixels 4L added to this divided image 3.

The values of the pixels in the line 3L1 are stored in the pixel storage unit 103 as the above-described first pixel group (the margin pixels 3T). Further, the values of the pixels in the line 3L2 are stored in the pixel storage unit 103 as the above-described second pixel group. Further, two pixels in the divided image 4 that are adjacent to the lines 3L1 and 3L2 are stored in the pixel storage unit 103 as the above-described third and fourth pixel groups, respectively. In this manner, the values of the pixels necessary to perform the filter processing on the pixels in the line 3L1 can be referred to by the image processing unit 105. Therefore, in the present exemplary embodiment, in step S406, the image processing unit 105 performs the filter processing on the pixels in the line 3L1 as the filter processing for the pixels immediately below the divided image 1 after performing the filter processing on the pixels in the divided image 1, as described above.

Returning to the description of FIG. 4, in step S410, the image processing unit 106 determines whether the filter processing for the divided image 3 is completed. If a result of this determination indicates that the filter processing for the divided image 3 is not completed yet (NO in step S410), the processing of the flowchart illustrated in FIG. 4 returns to step S409, in which the image processing unit 106 continues performing the filter processing until the image processing unit 106 completes the filter processing for the divided image 3 (YES in step S410).

Figure 7A:
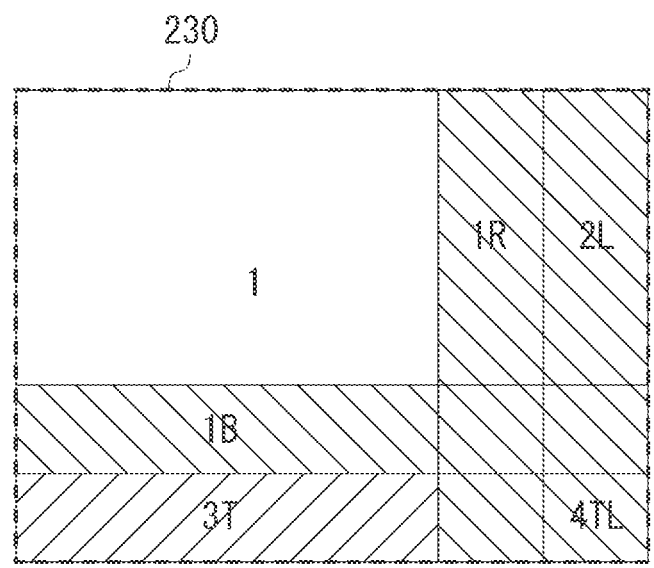
FIGS. 7A and 7B illustrate image regions in the divided images that are referred to by image processing units.
Figure 7B:
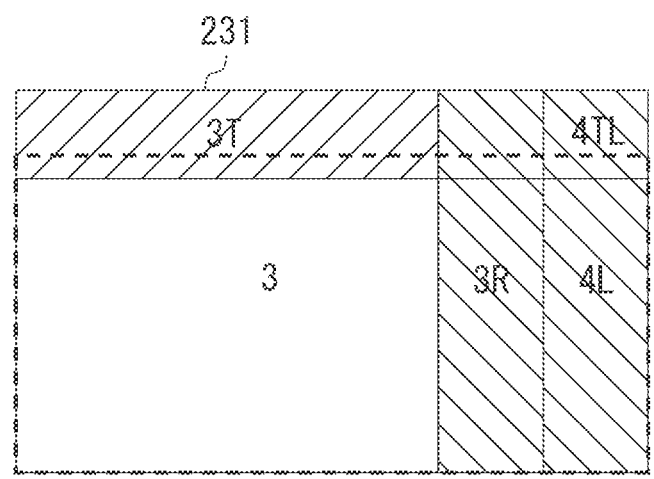

FIGS. 7A and 7B illustrate examples of image regions in the divided images 1 and 3 that are referred to by the image processing units 105 and 106, respectively.

In FIGS. 7A and 7B, regions surrounded by broken lines are regions that are set as targets of the filter processing. An image 230 includes the divided image 1, and the margin pixels 3T, 2L, and 4TL (4L) that are referred to when the filter processing is performed on the divided image 1. The divided image 1 is input into the image processing unit 105 as the image with the pixels including the margin pixels 2L in the divided image 2, the margin pixels 3T in the divided image 3, and the margin pixel(s) 4TL in the divided image 4 added thereto, and is subjected to the filter processing. An image 231 includes the divided image 3, and the margin pixels 4L that are referred to when the filter processing is performed on the divided image 3. The divided image 3 is input into the image processing unit 106 as the image with the pixels including the margin pixels 4L in the divided image 4 added thereto, and is subjected to the filter processing only on the lines that do not include the line(s) for which margin pixels 1B in the divided image 1 are referred to, among the lines in the divided image 3.

Returning to the description of FIG. 4, upon completion of all filter processing procedures for the divided images 1 and 3 in this manner (YES in step S410), the processing of the flowchart illustrated in FIG. 4 proceeds to step S411. In step S411, the image processing units 105 and 106 output the pixels for which the filter processing is completed to the subsequent-stage image processing unit 107. At this time, the image processing unit 105 outputs the margin pixels 3T processed by the filter processing to the subsequent-stage image processing unit 107 as the pixels located immediately below the divided image 1.

Subsequently, in step S412, the subsequent-stage image processing unit 107 performs the image processing on the divided images 1 and 3 subjected to the filter processing by the image processing units 105 and 106.

Subsequently, in step S413, the subsequent-stage image processing unit 107 temporarily stores the output image acquired by performing the image processing into the frame memory 108. Then, the image output unit 109 reads out the output image from the frame memory 108 and outputs the output image when the output timing comes.

In this manner, according to the present exemplary embodiment, the margin pixels 2L and 4L are added to the divided images 1 and 3, respectively. Further, the values of the margin pixels 3T and 4TL, and the values of the pixels in the divided images 3 and 4 that are other pixels than the margin pixels 3T and 4TL and are referred to when the filter processing is performed on the margin pixels 3T are stored into the pixel storage unit 103. Then, the image processing unit 105 performs the filter processing on the pixels in the divided image 1 and the margin pixels 3T stored in the pixel storage unit 103. Further, the image processing unit 106, which performs the filter processing in parallel with the image processing unit 105, performs the filter processing on the pixels for which the pixels in the divided image 1 are not referred to (other pixels than the margin pixels 3T), among the pixels in the divided image 3. Therefore, the present exemplary embodiment eliminates the necessity of setting the scanning directions of the divided images to different directions for the respective divided images, and the necessity of preparing the frame buffer for storing the divided images and the buffer for storing the margin pixel for each divided image. As a result, even in the case where the image processing system is configured to perform the filter processing on the divided images immediately after the divided images are input in parallel, a special transmission/reception apparatus need not be prepared, and an image processing apparatus capable of reducing the memory cost can be realized. Further, the filter processing can be performed on all of the pixels (pixels that can be filtered) in the divided images 1 to 4. Therefore, the filter processing can be easily and appropriately performed on the divided images.

The present exemplary embodiment is configured in such a manner that the two image processing apparatuses 100a and 100b each process the two divided images vertically adjacent to each other (the divided image 1 and the divided image 3, or the divided image 2 and the divided image 4). However, the present exemplary embodiment does not necessarily have to be configured in this manner.

For example, in a case where a single image processing apparatus has a capability of processing in parallel two divided images (the divided image 1 and the divided image 2, and the divided image 3 and the divided image 4) each having a size of an image generated by vertically dividing the 8K4K image into two images, the present exemplary embodiment may be configured in such a manner that this single image processing apparatus performs the processing. In the case where the present exemplary embodiment is configured in this manner, the image stored in the frame memory 108 is the entire 8K4K image (entire screen).

Further, a single image processing apparatus may sequentially process the divided images while processing the two divided images vertically adjacent to each other (the divided image 1 and the divided image 3, or the divided image 2 and the divided image 4) at one time. In the case where the present exemplary embodiment is configured in this manner, a frame buffer is provided to the image combining/output unit 110. The two divided images vertically adjacent to each other that have been processed first are stored into this frame buffer, and are combined to the two divided images vertically adjacent to each other that have been processed next.

The image processing system should be configured in such a manner that the divided image including the margin pixels to be stored in the pixel storage unit 103, and the divided image on which the filter processing is performed with reference to these margin pixels are input into each of the image processing apparatuses 100a and 100b at the same time. For example, the image processing system should be configured in such a manner that the divided image 3 including the margin pixels 3T to be stored in the pixel storage unit 103, and the divided image 1 on which the filter processing is performed with reference to these margin pixels 3T are input into the image processing apparatus 100a at the same time.

Further, the present exemplary embodiment is configured in such a manner that each of the image processing apparatuses 100a and 100b outputs the pair of two divided images vertically adjacent to each other (the pair of the divided images 1 and 3 or the pair of the divided images 2 and 4) after combining them. However, the present exemplary embodiment need not necessarily be configured in this manner. For example, each of the image processing apparatuses 100a and 100b may output the same number of divided images as the number of input divided images. In other words, the image processing apparatuses 100a and 100b may output the four divided images 1, 2, 3, and 4 processed by the image processing as individual images. In the case where the present exemplary embodiment is configured in this manner, the image combining/output unit 110 combines the four divided images.

Further, the present exemplary embodiment is configured in such a manner that each of the image processing apparatuses 100a and 100b performs the image processing (the filter processing) while processing the pair of two divided images vertically adjacent to each other (the pair of the divided images 1 and 3 or the pair of the divided images 2 and 4) at one time (in other words, the present exemplary embodiment is configured in such a manner that the vertical direction corresponds to one direction and the horizontal direction corresponds to another direction). However, the present exemplary embodiment need not necessarily be configured in this manner. For example, the present exemplary embodiment may be configured in such a manner that each of the image processing apparatuses 100a and 100b performs the image processing (the filter processing) while processing a pair of two divided images horizontally adjacent to each other (e.g., a pair of the divided images 1 and 2 or a pair of the divided images 3 and 4) at one time (in other words, the present exemplary embodiment may be configured in such a manner that the horizontal direction corresponds to the one direction and the vertical direction corresponds to the other direction).

In a case where the pixel scanning direction is the direction from the left to the right, one of the two divided images 1 and 2 that is located at a position in the arrangement order that is scanned later according to the scanning direction is the divided image 2, and the other of the divided images 1 and 2 that is located at a position in the arrangement order that is scanned earlier according to the scanning direction is the divided image 1. The same also applies to the divided images 3 and 4.

Further, the pixels that are referred to when the filter processing is performed on the divided image 1 (the margin pixels 3T), among the pixels in the divided image 3, are added to the divided image 1. Similarly, the margin pixels 4T are added to the divided image 2.

Then, the pixel storage unit 103 stores the values of the pixels belonging to the first pixel group, which includes pixels that are referred to when the filter processing is performed on the pixels in the divided image 1, among the pixels in the divided image 2. Further, the pixel storage unit 103 stores the values of the pixels belonging to the second pixel group, which includes pixels that are other pixels than the pixels belonging to this first pixel group and are referred to when the filter processing is performed on the pixels belonging to this first pixel group, among the pixels in the divided image 2. In the example illustrated in FIG. 1, supposing that the filter is the 3×3 filter, pixels in a line (column) at a boundary with the divided image 1 (i.e., the margin pixels 2L), among the pixels in the divided image 2, correspond to the first pixel group. Further, pixels in a line (column) right adjacent to the line (column) at the boundary with the divided image 1 (i.e., pixels right adjacent to the margin pixels 2L), among the pixels in the divided image 2, correspond to the second pixel group.

Further, the pixel storage unit 103 stores the value(s) of the pixel(s) belonging to the third pixel group, which includes a pixel or pixels that is/are referred to when the filter processing is performed on the pixels in the divided image 1, among the pixels added to the divided image 2 (the margin pixels 4T illustrated in FIG. 1). Further, the pixel storage unit 103 stores the value(s) of the pixel(s) belonging to the fourth pixel group, which includes a pixel or pixels that is/are another pixel or other pixels than the pixel(s) belonging to this third pixel group and is/are referred to when the filter processing is performed on the pixels belonging to the above-described first pixel group, among the pixels added to the divided image 2 (the margin pixels 4T illustrated in FIG. 1). In the example illustrated in FIG. 1, supposing that the filter is the 3×3 filter, the pixel adjacent to the divided image 1 (the pixel at the upper left corner) (i.e., the margin pixel 4TL), among the margin pixels 4T, corresponds to the third pixel group. Further, a pixel right adjacent to the pixel adjacent to the divided image 1 (the pixel at the upper left corner) (i.e., a pixel right adjacent to the margin pixel 4TL), among the margin pixels 4T, corresponds to the fourth pixel group.

Then, the image processing unit 105 performs the filter processing on the divided image 1 and the margin pixels 2L. In parallel with this filter processing, the image processing unit 105 performs the filter processing on pixels for which the divided image 1 need not be referred to when the filter processing is performed (other pixels than the margin pixels 2L), among the pixels in the divided image 2.

Further, the present exemplary embodiment has been described based on the example in which the number of divided images is four, but the number of divided images is not limited to four as long as the number of divided images is plural. Further, the present exemplary embodiment has been described based on the example in which the sizes of the divided images are the same, but the sizes of the divided images need not necessarily be the same.

Figure 8:
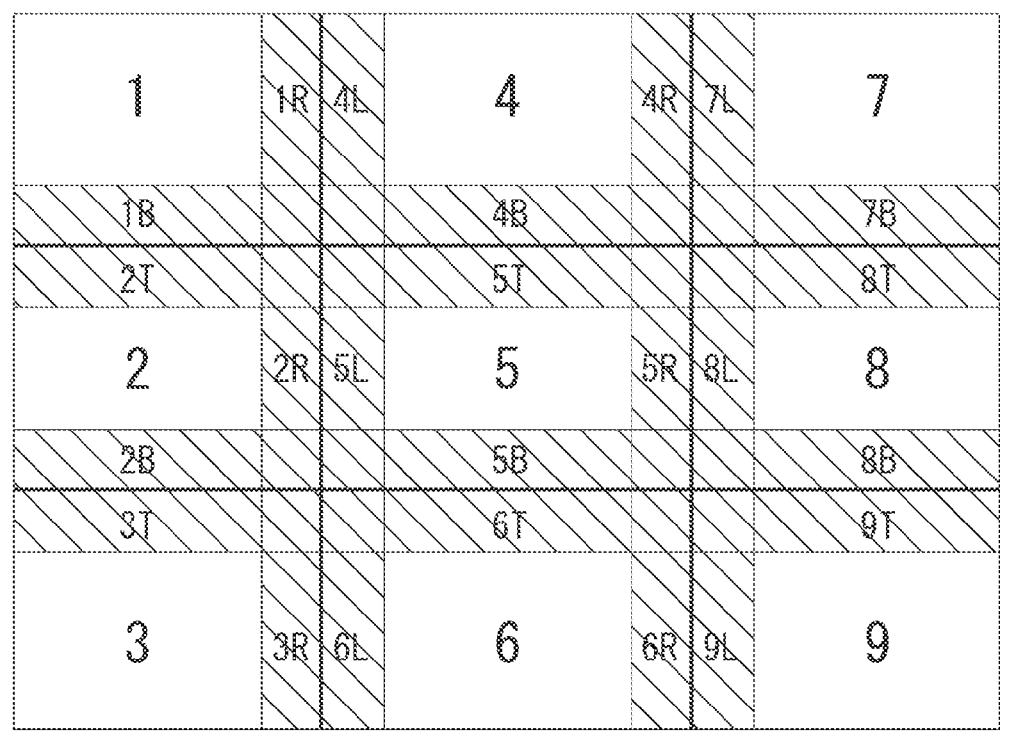

FIG. 8 illustrates a modification of the entire image of the single frame before the image is divided. FIG. 8 illustrates an example when the 8K4K image is divided into three images in each of the vertical and horizontal directions so that the number of divided images is nine.

Figure 9C:
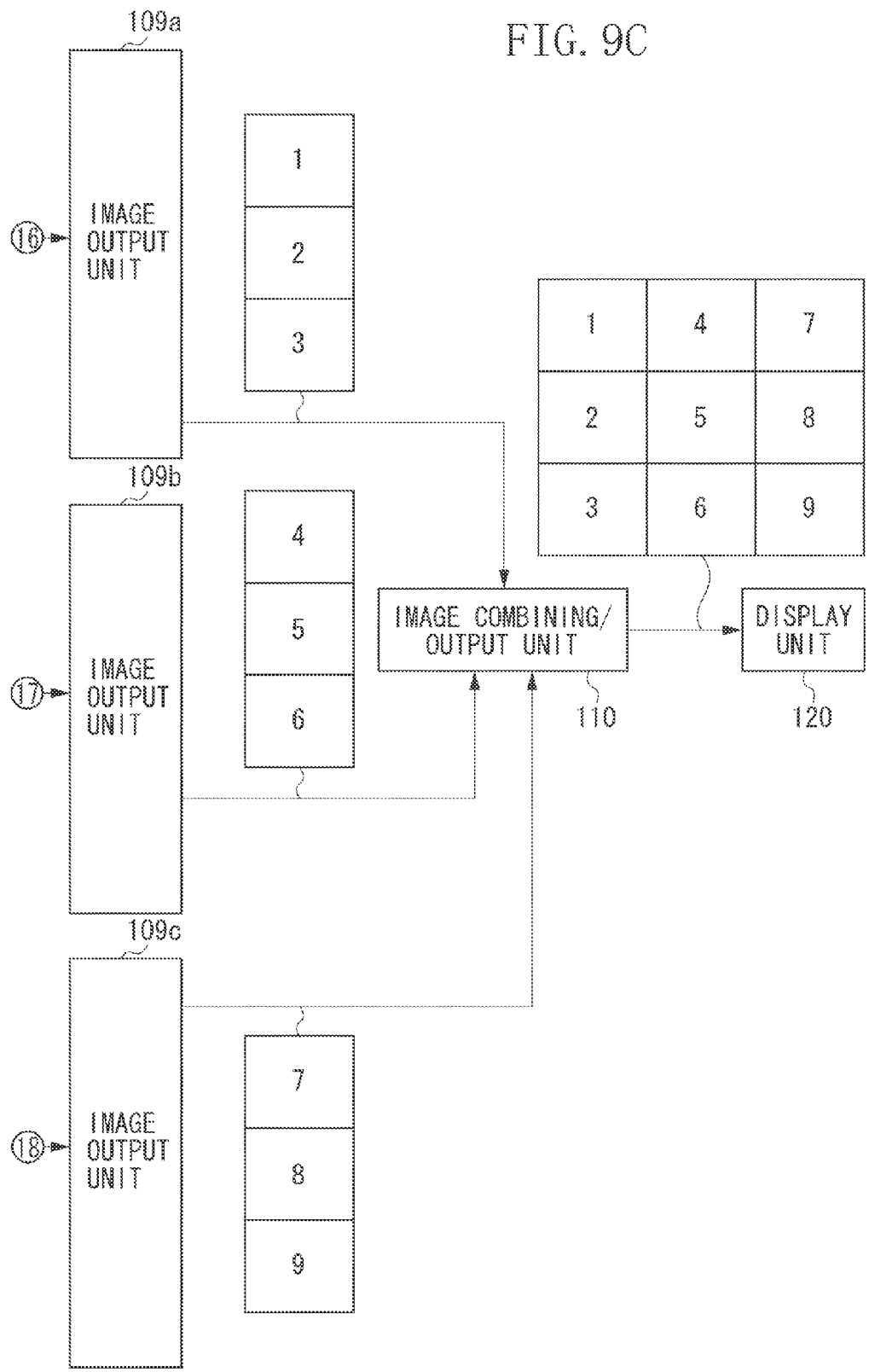
FIG. 9 (including FIGS. 9A, 9B, and 9C) is a block diagram illustrating a modification of the image processing system.

FIG. 9 (including FIGS. 9A, 9B, and 9C) illustrates a modification of the image processing system.

In the example illustrated in FIG. 9, three divided images vertically adjacent to one another (e.g., divided images 1, 2, and 3) are input into each of three image processing apparatuses at the same time, and parallel processing is performed. Pixels that are referred to when the filter processing is performed on each of divided images 1 to 9, among pixels in a divided image horizontally adjacent to each of the divided images 1 to 9, are added to each of the divided images 1 to 9. For example, pixels that are referred to when the filter processing is performed on the divided image 5 (margin pixels 2R and 8L), among pixels in the divided images 2 and 8 horizontally adjacent to the divided image 5, are added to the divided image 5.

Further, for example, pixel storage units 103a to 103f are provided for lower two divided images among the three divided images vertically adjacent to one another (no pixel storage unit is provided for the uppermost divided images 1, 4, and 7). Each of the pixel storage units 103a to 103f stores the values of the pixels belonging to the above-described first to fourth pixel groups. For example, the pixel storage unit 103c for the divided image 5 stores values of pixels (margin pixels 5T) that are referred to when the filter processing is performed on pixels in the divided image 4, among pixels in the divided image 5, as the values of the pixels belonging to the first pixel group. Further, the pixel storage unit 103c stores values of pixels that are other pixels than the pixels belonging to this first pixel group (the margin pixels 5T) and are referred to when the filter processing is performed on the pixels belonging to this first pixel group, among the pixels in the divided image 5, as the values of the pixels belonging to the second pixel group.

Further, the pixel storage unit 103c stores values of pixels that are referred to when the filter processing is performed on the pixels in the divided image 4, among the pixels added to the divided image 5 (the margin pixels 2R and 8L), as the values of the pixels belonging to the third pixel group. In the example illustrated in FIG. 8, a pixel or pixels in a region where the margin pixels 2R and margin pixels 2T overlap each other, and a pixel or pixels in a region where the margin pixels 8L and margin pixels 8T overlap each other correspond to the pixels belonging to the third pixel group. Further, the pixel storage unit 103c stores values of pixels that are other pixels than the pixels belonging to the third pixel group and are referred to when the filter processing is performed on the pixels belonging to the first pixel group, among the pixels added to the divided image 5 (the margin pixels 2R and 8L), as the values of the pixels belonging to the fourth pixel group.

Then, the filter processing is performed on the two divided images vertically adjacent to each other in a similar manner to the example in which the number of divided images is four. For example, when the filter processing is performed on the divided image 5, the filter processing for the divided image 5 is started from an uppermost line (row) among pixels for which the pixels in the divided image 4 need not be referred to when the filter processing is performed, i.e., a line (row) next to the margin pixels 5T. Further, for pixels (margin pixels 5B) for which pixels in the divided image 6 are referred to when the filter processing is performed on the divided image 5, among the pixels in the divided image 5, the filter processing is performed with reference to the values of the pixels stored in the pixel storage unit 103d. More specifically, the filter processing is performed with reference to values of margin pixels 6T, a pixel or pixels in a region where margin pixels 3R and 3T overlap each other, and a pixel or pixels in a region where margin pixels 9L and 9T overlap each other.

Further, values of remaining pixels (the margin pixels 5T), among the pixels in the divided image 5, are stored in the pixel storage unit 103c. Therefore, the filter processing for the margin pixels 5T is performed successively after the filter processing for the divided image 4.

The other processes can be performed in a similar manner to the example in which the number of divided images is four, and thus, detailed descriptions thereof are omitted here.

Further, in a case where the image is divided in only one direction (e.g., the vertical direction) (into upper and lower two images) so that two divided images are generated, there is no divided image adjacent in the other direction (e.g., the horizontal direction). Therefore, in the case where the image processing system is configured in this manner, the divided image need not be subjected to an addition of the pixels (the margin pixels) in the divided image adjacent to this divided image in the other direction (e.g., the horizontal direction).

Any of the above-described exemplary embodiments only indicates an example of how the present invention is embodied when the present invention is carried out, and the technical scope of the present invention should not be construed limitedly by these exemplary embodiments. In other words, the present invention can be carried out in various kinds of forms without departing from its technical idea or its main features.

According to the present invention, the filter processing can be easily and appropriately performed on the divided images.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009880 filed Jan. 22, 2014, which is hereby incorporated by reference herein in its entirety.

What is claimed is:

1. An image processing apparatus comprising:
a first image processor configured to obtain a first divided image among divided images generated by dividing a single image, and further configured to perform, based on the obtained first divided image, image processing for a processing target pixel on a first part of the first divided image with use of values of pixels surrounding the processing target pixel; and
a second image processor configured to obtain a second divided image adjacent to the first divided image among the divided images and obtain a partial image of the first divided image comprising pixels surrounding a pixel included in the second divided image, and further configured to perform, based on the obtained second divided image and the obtained partial image of the first divided image, the image processing for a processing target pixel on the second divided image and a processing target pixel on a second part of the first divided image with use of values of respective pixels surrounding the processing target pixels,
wherein a processed image based on the image processing by the first image processor and the image processing by the second image processor is outputted, the processed image comprising an image obtained by the image processing on the first divided image and an image obtained by the image processing on the second divided image.

2. The image processing apparatus according to claim 1, wherein the image processing is filter processing for determining a value of a processing target pixel with use of the values of the pixels surrounding the processing target pixel.

3. The image processing apparatus according to claim 2, wherein the pixels surrounding the processing target pixel are determined based on a size of a filter for the filter processing.

4. The image processing apparatus according to claim 1, further comprising a memory configured to store the partial image of the first divided image as an image for the image processing to be performed by the second image processor.

5. The image processing apparatus according to claim 1, wherein the first divided image is an image behind the second divided image in an order according to a scanning direction of the image processing.

6. An image processing method comprising:
inputting, into a first image processor, a first divided image among divided images generated by dividing a single image;
inputting, into a second image processor, a second divided image adjacent to the first divided image among the divided images;
inputting, into the second image processor, a partial image of the first divided image comprising pixels surrounding a pixel included in the second divided image;
performing, by the first image processor, first image processing for a processing target pixel on a first part of the first divided image with use of values of pixels surrounding the processing target pixel, based on the input first divided image;
performing, by the second image processor, the image processing for a processing target pixel on the second divided image and a processing target pixel on a second part of the first divided image with use of values of respective pixels surrounding the processing target pixels, based on the input partial image of the first divided image and the input second divided image; and
outputting a processed image generated based on the image processing by the first image processor and the image processing by the second image processor, wherein the processed image comprises an image obtained by the image processing on the first divided image and an image obtained by the image processing on the second divided image.

7. The image processing method according to claim 6, wherein the pixels surrounding the processing target pixel are determined based on a size of a filter for filter processing as the image processing.

8. The image processing method according to claim 6, further comprising storing the partial image of the first divided image to be input into the second image processor.

9. A non-transitory computer-readable medium storing a program for causing a computer to execute a method, the method comprising:
inputting, into a first image processor, a first divided image among divided images generated by dividing a single image;
inputting, into a second image processor, a second divided image adjacent to the first divided image among the divided images;
inputting, into the second image processor, a partial image of the first divided image comprising pixels surrounding a pixel included in the second divided image;
performing, by the first image processor, image processing for a processing target pixel on a first part of the first divided image with use of values of pixels surrounding the processing target pixel, based on the input first divided image;

performing, by the second image processor, the image processing for a processing target pixel on the second divided image and a processing target pixel on a second part of the first divided image with use of values of respective pixels surrounding the processing target pixels, based on the input partial image of the first divided image and the input second divided image; and outputting a processed image generated based on the image processing by the first image processor and the image processing by the second image processor, wherein the processed image comprises an image obtained by the image processing on the first divided image and an image obtained by the image processing on the second divided image.

10. The medium according to claim 9, wherein the pixels surrounding the processing target pixel are determined based on a size of a filter for filter processing as the image processing.

11. The medium according to claim 9, the method further comprising storing the partial image of the first divided image to be input into the second image processor.

12. The image processing apparatus according to claim 1, wherein the partial image of the first divided image obtained by the second image processor comprises a first pixel group composed of the pixels surrounding the pixel included in the second divided image and a second pixel group composed of pixels surrounding a pixel included in the first pixel group.

13. The image processing apparatus according to claim 1, wherein
the second part of the first divided image is composed of all pixels on the first divided image except all pixels on the first part of the divided image.

14. The image processing apparatus according to claim 1, wherein
the first part of the first divided image is a part of the first divided image for which the image processing can be performed without use of a value of a pixel included in the second divided image by the first image processor, and wherein
the second part of the first divided image is a part of the first divided image for which the image processing is performed with use of a value of a pixel included in the second divided image by the second image processor.

15. The image processing apparatus according to claim 1, wherein
the first image processor comprises a processor and/or a circuit, and wherein
the second image processor comprises a processor and/or a circuit.

16. The image processing apparatus according to claim 1, wherein,
the first image processor is configured to obtain the first divided image and a partial image of a third divided image comprising pixels surrounding a pixel included in the first divided image, wherein the third divided image is adjacent to the first divided image in a direction different from that of the second divided image, and further configured to perform the image processing for the first part of the first divided image, based on the obtained first divided image and the partial image of the third divided image obtained by the first image processor, and wherein
the second image processor is configured to obtain the partial image of the first divided image, the second divided image, a partial image of the third divided image comprising pixels surrounding a pixel included in the second divided image and a partial image of a fourth divided image comprising pixels surrounding a pixel included in the second divided image, wherein the fourth divided image is adjacent to the second divided image in a direction different from that of the first divided image, and further configured to perform the image processing for the second divided image and the second part of the first divided image, based on the obtained partial image of the first divided image, the obtained second divided image, the partial image of the third divided image obtained by the second image processor and the obtained partial image of the fourth divided image.

* * * * *